J. HELM.
Cultivators.

No. 138,085.  Patented April 22, 1873.

2 Sheets--Sheet 1.

Witnesses:
A. Bennecendorf
C. Sedgwick

Inventor:
J. Helm
per Munn & Co.
Attorneys.

2 Sheets--Sheet 2.

J. HELM.
Cultivators.

No. 138,085.

Patented April 22, 1873.

Witnesses:
A. Bennernendorf
C. Sedgwick

Inventor:
J. Helm
Per
Attorneys.

UNITED STATES PATENT OFFICE.

JACK HELM, OF HOCHHEIM, TEXAS, ASSIGNOR TO HIMSELF AND CHARLES TIMM, OF SAME PLACE.

IMPROVEMENT IN CULTIVATORS.

Specification forming part of Letters Patent No. 138,085, dated April 22, 1873; application filed November 16, 1872.

*To all whom it may concern:*

Be it known that I, Captain JACK HELM, of Hochheim, in the county of De Witt and State of Texas, have invented a new and Improved Cultivator, of which the following is a specification:

The invention consists in an improved mode of connecting eveners with a pair of gang-plows or cultivators, as hereinafter fully described and pointed out in the claim.

Figure 1:
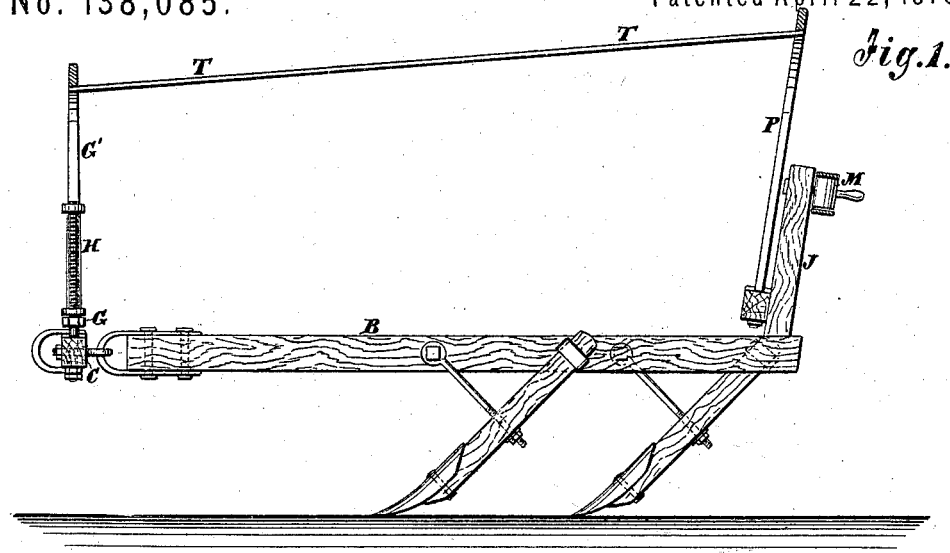
Figure 2:
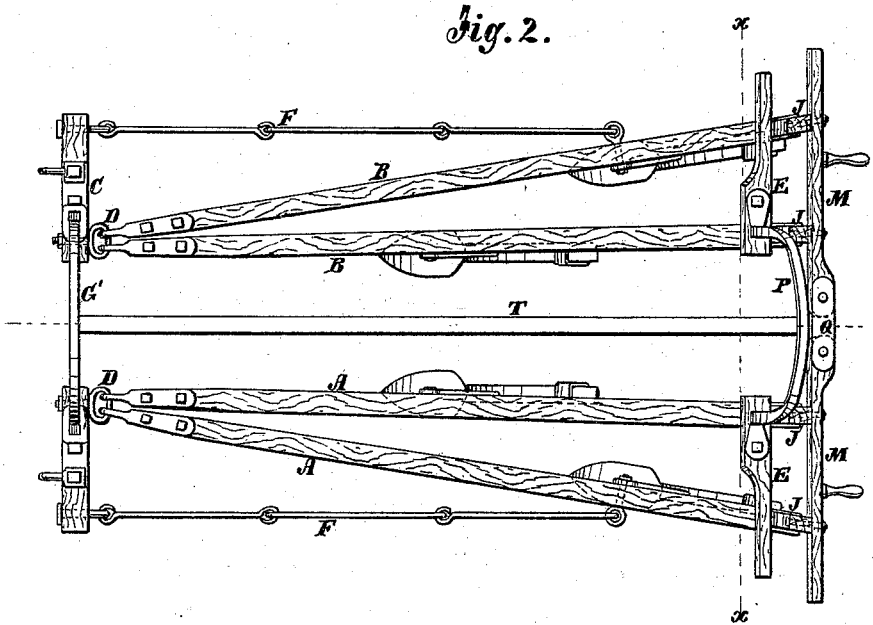
Figure 3:
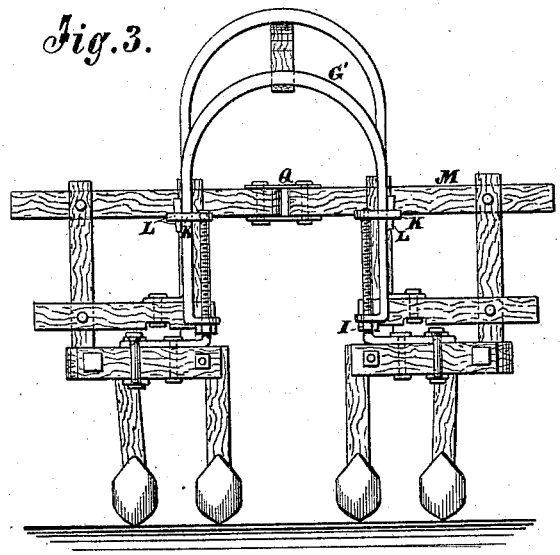
Figure 5:
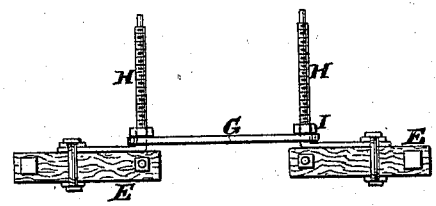
Figure 4:
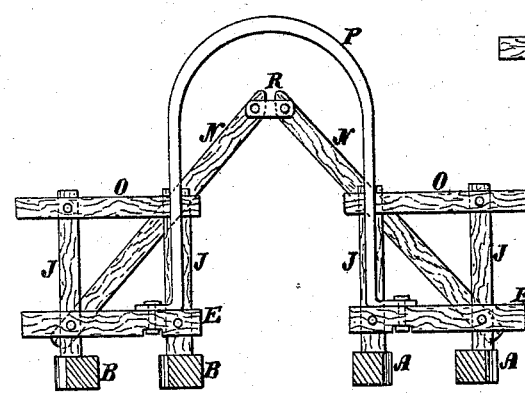
Figure 6:
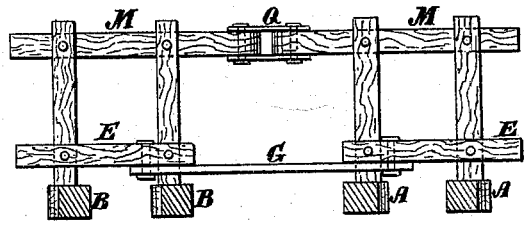

Figure 1 is a longitudinal sectional elevation of my improved cultivator. Fig. 2 is a plan, and Fig. 3 is a front elevation, of the machine, with the connecting-yokes used for high corn, but with the cross-piece used when the corn is of medium height. Fig. 4 is a transverse section on the line $x\ x$ of Fig. 2, showing the connecting devices for high corn and the cross-bar for the same. Fig. 5 is a partial elevation, showing the connecting-bar for low corn; and Fig. 6 is a section on the line $x\ x$ of Fig. 2, with the connections for the low corn.

Similar letters of reference indicate corresponding parts.

A A and B B represent two gangs of two cultivator-plows, each of any approved construction, attached to an evener, C, in the same ring D, and connected together at the rear by a cross-piece, E, attached to vertical standards J rising from the top of the beams, which separate the plows from each other the requisite distance. The outer beam is connected to the outer end of the evener by a chain, F, which also assists in keeping the plows separate at the rear by its tendency to pull the outer one away from the other laterally. The two gangs are connected by a straight bar, G, when the corn or other plant being cultivated is not very high; but when more advanced a yoke, G', is substituted at the front for the straight bar, and the yoke P, which is always used at the rear with other interchangeable connections, answers when the straight bar is removed. The screw-threaded standards H attached to and rising vertically from the eveners, with suitable nuts I, are used for attaching either of these devices; but where the yoke is attached the clips K and keys L are used in addition. Both the yoke and the straight bar can be adjusted vertically on the standards to some extent, but additional nuts, I, will be required for this purpose with the bar G. The plow-beams are provided with the vertical standards J for being connected by the short cross-pieces E; also, by the long jointed cross-piece M, when the corn is not too high to admit of it, or by the Λ-bars N, and the short cross-pieces O, when the corn is too high for the use of the jointed cross-bar M. They are also connected by the yoke P, which is bolted to the top of the short cross-pieces E.

The standards J, cross-pieces E M or N O, keep the plows from swaying laterally too much, as well as separate from each other the distance required.

The joint Q of the cross-bars M, also the joint R of the bars N, allow the two gangs of plows to work forward and back relatively to each other, as necessary, on account of the uneven action of the team, which will, like the cultivator, work on both sides of the row. The yokes G and P are connected together by a bar or rod, T, which serves to stay and strengthen the machine.

Having thus described my invention, I claim as new and desire to secure by Letters Patent—

The connected eveners C C, attached to the end of gang-plow frames by rings D, and to the sides of said gang-plows by the jointed rods F F, as and for the purpose described.

JACK HELM.

Witnesses:
J. H. SCHWAB,
J. F. CUNNINGHAM.